Patented Mar. 20, 1945

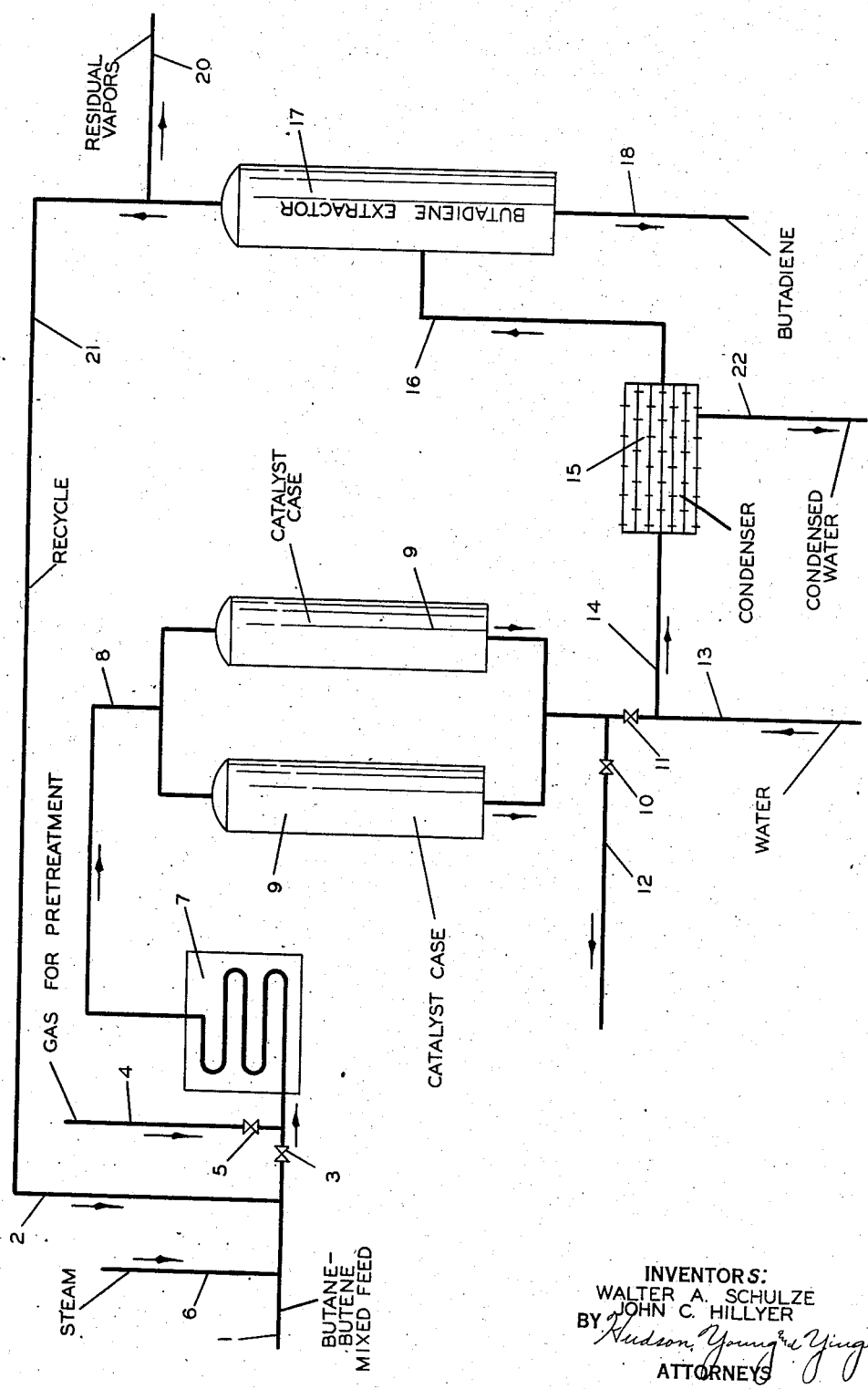

2,371,850

UNITED STATES PATENT OFFICE 2,371,850

PROCESS FOR DEHYDROGENATION OF HYDROCARBONS

Walter A. Schulze and John C. Hillyer, Bartlesville, Okla., assignors to Phillips Petroleum Company, a corporation of Delaware Application March 23, 1942, Serial No. 435,896

7 Claims. (Cl. 260—680)

This invention relates to the catalytic dehydrogenation of hydrocarbons to produce olefins and diolefins. It relates more specifically to an improved process for the production of low-boiling aliphatic diolefins from the corresponding monoolefins.

In the catalytic dehydrogenation of olefins to produce diolefins without alteration of the carbon chain, the high temperatures of operation and the reactive nature of both feed and product have necessitated the development of highly selective catalysts and conversion conditions. Thus, in view of the effect of temperature on the olefin-diolefin equilibrium, it has proved desirable to operate at temperatures well within the range of thermal decomposition and to suppress same as far as possible by employing low pressures, high flow rates, large proportions of inert diluent, particularly water vapor, along with specially compounded and/or deactivated catalysts. The latter have been developed to the point that their activity in promoting each possible reaction of the hydrocarbons with which they are in contact has been studied and modified to conform to maximum efficiency in diolefin production.

However, in spite of these developments which have greatly improved the economics of olefin dehydrogenation, one of the principal difficulties encountered has been the non-uniform results obtained during the span of a conversion period. In particular, there have been apparent variations in the activity and selectivity of the catalyst after reactivation which have resulted in an unfavorable discrepancy between olefin conversion and diolefin yield. In fact, in the initial portion of the conversion period, with freshly reactivated catalyst, the peak olefin conversion often produces the lowest diolefin yield of the entire period indicating an abnormal rate of destruction of the diolefin formed. This unfavorable effect markedly reduces the average diolefin yield over the entire conversion period since it coincides with the period of highest catalyst activity and may not be entirely compensated for by subsequent operation at a lower conversion level and higher efficiency.

The conversion is, of course, accompanied by a gradual accumulation of carbonaceous deposits which result in reduced catalyst activity so that olefin conversion decreases with the length of the conversion period. Eventually, the declining activity makes continued use of the catalyst uneconomic, and the conversion period is terminated and the catalyst is reactivated by burning off the carbonaceous deposits. Thus, declining diolefin yields during the latter portion of the conversion period may be controlled and/or eliminated by employing shorter periods and more frequent catalyst reactivation.

However, such an expedient has not aided in eliminating the low diolefin yields in the initial portion of the conversion period since this portion of the period must be gone through following each reactivation. As a result average process yields are lowered and much valuable olefin feed stock is consumed in readjusting the reactivated catalyst to its optimum activity for diolefin production. The unfavorable effect is even cumulative, since destruction of the diolefin in the initial low-yield period usually causes heavier carbon deposits and more frequent reactivation.

It is the principal object of this invention to provide a process for catalytic dehydrogenation of olefins wherein the efficiency in diolefin production is nearly at a maximum when the hydrocarbon feed is first contacted with the catalyst. Another object of this invention is to provide a process for the dehydrogenation of olefins in which destruction of the diolefin product is largely suppressed in the initial portion of the conversion period immediately following catalyst reactivation. Still another object is to reduce the rate of carbon deposition when olefin feed stocks are contacted with freshly reactivated catalysts in processes of the type described, whereby longer conversion periods are possible with more uniform conversion and high diolefin yields throughout. These and other objects and advantages will be evident from the following disclosure.

We have now found that we are able to dehydrogenate monoolefins to the corresponding diolefins in conversion periods of increased length while substantially avoiding the period of very low diolefin yield and efficiency at the beginning of the period by means of a certain pretreatment of the catalyst. In our process, we pretreat the catalyst by contacting it with a relatively heat-resistant paraffinic hydrocarbon gas, generally one with fewer carbon atoms than the olefin it is subsequently desired to dehydrogenate. This pretreatment is conducted for a regulated time period at a temperature substantially in the range used for olefin dehydrogenation.

We have found that after such a pretreatment the catalyst exhibits slightly modified properties including somewhat improved dehydrogenating activity at the very start of the conversion period. Deleterious side reactions are markedly less prominent, while substantially maximum yields of diolefins are obtained initially or are rapidly attained. We have found that less of the valuable diolefinic product is destroyed in the catalyst space subsequent to its formation, and less of the monoolefin feed is likewise destroyed by conversion to undesirable product. The consequent controlled total monoolefin conversion together with the increased yield of diolefins produce a marked increase in the efficiency of the process for diolefin production.

Many concurrent reactions and/or changes in the catalyst may occur during our pretreating step. While the exact nature and extent of all the changes occurring and the mechanism by which the improvement of the catalytic properties is brought about is not fully understood, it is reasonably certain that some of the following changes may occur. Among these may be mentioned especially desorption of unreactive gases such as nitrogen, water vapor and the like from the surface of the catalyst, and perhaps, deposition of a fine layer of carbon on certain portions of the catalyst surface. Further reactions, such as reduction of higher metallic oxides which may be present in the catalyst to lower oxides, conversion and/or removal of acidic components of the catalyst, and the like may also occur.

Desorption of the unreactive gases adsorbed on the catalyst surface is very necessary before activity can attain its full value, since the dehydrogenation reaction apparently occurs only with hydrocarbon molecules which are themselves adsorbed on the catalyst surface. Oxygen and nitrogen are both known to be adsorbed very strongly on many of our preferred dehydrogenation catalysts, and require considerable time for complete desorption. Both these gases are present in fresh catalyst from contact with the air, and ordinarily in reactivated catalyst from the reactivation gas. The inert, tightly held nitrogen, oxygen, carbon oxides and other components of reactivation gases are replaced during the pretreatment by the paraffinic hydrocarbon employed. These latter, being more loosely adsorbed, are subsequently much more readily replaced by the reactive olefin gases of relatively analogous adsorption characteristics when the dehydrogenation is begun. Moreover, since we have found that at the temperature employed, the paraffin hydrocarbons may undergo a certain very small degree of conversion, some olefins and hydrogen may also be formed and adsorbed by the catalyst during the pretreating step. Hydrogen has been found to be very readily displaced by the olefin feed subsequently used, and while the amount present may be small, the effects are nevertheless beneficial in adjusting the catalyst activity.

Entirely aside from mechanical blanketing effects, oxygen adsorbed in the catalyst may have a further deleterious effect, by reacting with hydrocarbon constituents of the vapors to produce various organic oxygen containing compounds. These products, generally of an acidic nature, may have a catalytic effect on olefin and/or diolefin polymerization and olefin isomerization reactions, causing thereby considerable additional losses of these valuble products until the oxygen and/or acidic matter formed during reactionation are completely expelled. By our improved process this difficulty is obviated.

It is well known that many catalysts of the type employed function only when very dry and in the absence of water vapor. Even when a water-resistant catalyst is employed in the presence of water vapor, it has been found that the presence of absorbed water vapor on the catalyst surface prior to contacting with the hydrocarbon results in poor yields until this vapor is removed. In both the above cases, the pretreatment of our process serves to free the catalyst from traces of water resulting from the reactivation process. However, the effects of the present process greatly surpass the benefits of dehydration alone.

The conversion of the pretreating paraffin hydrocarbons, while very slight, may also result in the deposition of a thin layer of carbon on portions of the catalyst surface. This alters the catalyst to a greater or less degree, and apparently affects particularly those centers responsible for the undesirable destructive reactions. We have found that such a carbon deposit is not primarily responsible for any increase in dehydrogenating activity subsequently displayed, for such a layer deposited on an inert porous carrier displays but slight activity in olefin dehydrogenation. In fact, the carbon deposit is ordinarily so slight on the catalyst following our pretreatment as to be hardly detectable on visual inspection except at relatively scattered points on the surface of random catalyst granules.

The presence of oxides of various metallic elements in minor quantities in mineral catalyst is well known, as for example, iron oxides, titanium oxides, and the like in bauxite. The higher oxides of these elements such, as for example, ferric oxide, are known to be catalysts for cracking reactions, and when present in dehydrogenation catalysts result in reduced efficiency. These oxides may be reduced to the lower form during our pretreating process in which form they are relatively inactive in catalyzing undesirable reactions. However, it is considered of great significance that the predicated reduction of the oxides in our process is not sufficiently drastic to produce the corresponding metals, e. g., iron, which might be even more undesirable than the higher oxides.

We believe that the improved results obtained by our process are not due solely to any one of the above-mentioned effects but to the peculiar combination of all, and perhaps others less clearly understood, which occur during our pretreating process. It is an advantage of our process that all the components of the catalyst are modified and all the desired reactions brought about by a single, relatively simple operating step. We have also found that due to the lower initial rate of destruction of hydrocarbon, and the consequent lower rate of accumulation of carbonaceous deposits, the activity of the catalyst declines less rapidly. We are able thereby to realize even higher composite yields of diolefins and efficiencies in the conversion thereto; or conversely, if we desire, to increase materially the length of the practicable operating cycle.

In one specific embodiment, our invention comprises producing butadiene by dehydrogenation of normal butenes over a bauxite type catalyst which has been pretreated at or near dehydrogenation temperature with a paraffin hydrocarbon chosen from the group methane through propane inclusive, or mixtures thereof. The process may be more readily understood by reference to the drawing, which is a diagrammatic view of one form of apparatus in which our process may be carried out.

In the figure, essentially paraffin hydrocarbon gas for the pretreatment enters the system through line 4 and valve 5, which is opened. Valve 3 is closed at this time. This paraffin passes through the heater 7 where it is heated to a temperature substantially within the range employed for butene dehydrogenation. The hot vapors then pass through line 8 to catalyst cases 9 containing a dehydrogenation catalyst. The hot vapors then exit through line 12 and valve 10, valve 11 being closed.

When the pretreatment step is completed, fresh olefin-containing feed is admitted through line 1 and steam through line 6. The flow of paraffin is cut off by closing valve 5 and the hydrocarbon-steam mixture is admitted through valve 3 to heater 7, where it is heated to conversion temperature. The hot vapors then pass through line 8 to catalyst cases 9 where they in turn contact the pretreated dehydrogenation catalyst. The treated vapors exit through valve 11 and line 14. Valve 10 is closed. The hot vapors passing through line 14 may be chilled by water injection through line 13 if desired and pass to condenser 15 wherein water vapor is condensed and condensate removed through line 22. The hydrocarbon vapors then pass through line 16 to diolefin separator 17 in which diolefins are extracted and removed through line 18. This may be effected by any one of several conventional methods such as chemical separation, solvent extraction or the like.

The residual vapors pass through line 19 and leave the system by line 20. Provision is made to return all or a part of the hydrocarbon vapors of the proper boiling range to the system through line 21 for further conversion if desired. In such a case hydrogen and other light vapors could be removed from the recycle portion by means of fractionators, and/or conventional arrangements of apparatus.

In the operation of our pretreatment step, we ordinarily prefer to employ paraffin hydrocarbons of at least one less carbon atom than the olefin to be dehydrogenated and particularly paraffins of one to three but not more than four carbon atoms. In this way the catalyst chambers may be maintained at substantially conversion temperature during the pretreating step since the lower paraffins are sufficiently more refractory than the olefin to be treated and the degree of conversion of the pretreating gas is always very slight. The temperature, length of pretreatment and time of contact employed are chosen with respect to the composition of the pretreating gas. Thus, if methane is used for the pretreatment, we may find a period of up to about two hours at 1200° F. and at a space velocity of 600-700 volumes of gas per volume of catalyst per hour to be satisfactory, while if propane is used in the same instance, a period of thirty minutes at a temperature of about 1175° F. and a similar flow rate may give equivalent results. In general, with the lower hydrocarbons somewhat longer pretreatment is used at relatively higher temperature than with the longer chain hydrocarbons, the exact values being dependent upon the catalyst used, degree of modification desired, and the like. Both methane and propane are very desirable hydrocarbons for the pretreatment. Ethane, while entirely suitable, is generally not so readily available except in mixtures for example with methane, the predominant component. Natural gas may often be employed very satisfactorily in this process at proper conditions, if the gas is not too rich, that is does not contain appreciable quantities of hydrocarbons higher boiling than propane or of olefins, etc. Butane's generally less satisfactory, although we have found that it may be used successfully if sufficiently low temperature and high flow rate be used for only a short period.

While our process is particularly adapted to the improvement of the yields obtained when using catalysts comprising bauxite, or modified bauxites, it is also applicable to a considerable variety of other catalysts. Among these may be mentioned particularly the natural minerals and the water-resistant group of dehydrogenation catalysts. Bauxite treated with alkali, or with alkaline earth hydroxides, particularly that treated with barium and strontium hydroxides may very satisfactorily be used for butene dehydrogenation. Brucite, and certain preparations of magnesium oxide also are useful in olefin dehydrogenation, as are bauxite catalysts impregnated with some magnesium oxide, or magnesium and barium oxides together. By the term water-resistant as applied to the catalysts which may be employed in this invention, we describe catalysts which are not poisoned by the presence of more than a trace of water vapor in the hydrocarbon undergoing treatment at the specified temperature. In addition to the above mentioned materials certain other catalysts fall into this category. The oxides of zirconium and titanium are capable of furnishing satisfactory catalyst in synthetic preparations as well as in certain natural mineral ores.

In the operation of our process, the charge stock is usually prepared in such proportions that the partial pressure of olefins is less than one atmosphere and ordinarily in the range 0.1 to 0.5 atmosphere. The volume of diluent, usually water vapor, added is from as low as 10 to as much as 90 or more per cent of the total being regulated to maintain the partial pressure of olefin at the desired value. A certain proportion of the corresponding paraffin, in this case n-butane, can be tolerated in the dehydrogenation charge stock, especially when using water-vapor as diluent together with a water-resistant catalyst. In such a process, disclosed in our copending application, Serial No. 412,637, filed September 27, 1941, olefins may be selectively dehydrogenated in the presence of considerable quantities of paraffins, the dehydrogenation of which latter is inhibited by the water vapor. Other gases than water vapor may be employed as diluents in our process. Among those which may be successfully used are nitrogen, carbon dioxide, and lower paraffins, such as methane, propane, and the like. In these cases, relatively small quantities of the corresponding paraffin, in this case butane, can be tolerated in the olefin feed.

We prefer to operate our process at low pressures, from about atmospheric to about 100 pounds gage. Low total pressure is desirable to increase the yield of diolefin. Also, since the partial pressure of olefin is ordinarily kept below 0.5 atmosphere, it is usually desirable to operate at low total pressure in order to have maximum volume concentrations of this component.

To obtain satisfactory conversion of low boiling aliphatic olefins to diolefins temperatures in the range 1100° F. to 1300° F. are ordinarily employed. Flow rates used are between 1 and 10 liquid volumes of olefin charge per hour per volume of catalyst. In terms of the total vapor mixture charged to the catalyst, space velocities of 500 to 5000 are satisfactory under proper conditions. The particular combination of flow rate and temperature for a specific operation will depend on the catalyst employed, the composition of the charge, and on the degree of conversion desired.

Since dehydrogenation is an equilibrium reaction, a portion of the butene will always remain unconverted, the exact proportion depending upon the equilibrium concentrations at the temperature employed and how closely other conditions of flow rate, catalyst activity and the like allow the equilibrium to be approached. Obviously, further diolefins could be obtained from the unconverted olefins by recycling all or any desired proportion of them. Normally hydrogen and all or a part of the other light gases present in the residual stream will be removed before recycling to avoid repressing the dehydrogenation. Numerous arrangements of conventional equipment may be used for this purpose.

The preferred catalysts prepared and/or selected by the methods described may be reactivated over long periods of use by treatment with oxidizing gases to burn out carbonaceous residues responsible for decreased activity. In the reactivation of the preferred catalysts, temperatures above about 1400° F. are usually avoided since permanent injury to the catalyst might result.

Normally the reactivation of the catalyst requires somewhat less time than the conversion period. This is more or less independent of the length of the conversion period since usually the quantity of coke deposited is less in a shorter period and less time accordingly is used to burn it off. The catalyst must then be raised to and maintained at operating temperature until the chamber is again put back on stream. The pretreatment of the present invention may serve this purpose as well, since it is carried out at or near operating temperature. Our improved process may thus be operated very conveniently and economically in the conventional equipment provided for dehydrogenation. In this way little, if any, added time is required for the additional pretreating step. Consequently, since the off-stream time for a catalyst case is not substantially increased, no increase in the size or number of catalytic converters required for a given plant is necessitated, and the full improvement in production of diolefins from a unit is realized.

The following examples will further illustrate specific applications of our process:

*Example I*

A dehydrogenation catalyst comprising granular calcined bauxite impregnated with three weight per cent of barium hydroxide was prepared for use by pretreatment with methane following reactivation. The pretreatment was carried out by passing methane over the catalyst at a temperature of 1200° F. and at a flow rate of 800 volumes (NTP) per volume of catalyst per hour for two hours.

At the end of the pretreatment, dehydrogenation of butene-2 was begun at once. The butene-2 admixed with three volumes of steam was charged to the catalyst at a total flow rate of the mixed vapors of 1300 volumes per hour. The dehydrogenating conditions were 1205° F. and a catalyst inlet pressure of about 4 pounds gage.

The operation was continued until the per pass conversion of butene dropped to about 30 per cent of the butene charged—a period of 12 hours. Results are tabulated below, showing the per pass conversion and yield of butadiene, based on the butene charged, and the conversion efficiency (yield/conversion×100).

| Time, hours | Percent butene converted per pass | Percent butene converted to butadiene | Per cent efficiency |
|---|---|---|---|
| ½ | 45 | 16.0 | 37 |
| 1 | 43 | 18.0 | 42 |
| 2 | 40 | 20.0 | 50 |
| 3 | 39 | 19.5 | 50 |
| 6 | 36 | 17.5 | 49 |
| 12 | 30 | 14.0 | 47 |

These results show that the efficiency in conversion to butadiene was initially high and remained in the range of 45 to 50 per cent during most of the period. The maintained catalyst activity and diolefin yield indicate excellent control of side reactions during the first hour or so of conversion.

In contrast, the same catalyst was employed under identical conditions after reactivation, except that the pretreatment was omitted. The operation was discontinued after six hours, when the per pass butene conversion had dropped to 31 per cent. Results are tabulated for comparison with those listed above:

| Time, hours | Per cent butene converted per pass | Per cent butene converted to butadiene | Per cent efficiency |
|---|---|---|---|
| ½ | 54 | 6.0 | 11 |
| 1 | 45 | 15.5 | 35 |
| 2½ | 41 | 18.0 | 44 |
| 6 | 31 (Discontinued) | 13.0 | 42 |

In this test while the latter portion of the period showed good results, the low efficiency in the first hour shows excessive destruction of butene and/or butadiene with consequent reduced production and appreciable shortening of the conversion period.

*Example II*

A portion of the catalyst described in Example I was pretreated with propane vapor at 1185° F. and a flow rate of 950 volumes per volume of catalyst per hour. The pretreating period was 30 minutes. Subsequent use of the catalyst to dehydrogenate butene-2 gave results essentially similar to those obtained with pretreated catalyst of Example I.

*Example III*

Bauxite catalyst modified by addition of catalytic proportions of barium and magnesium hydroxides was pretreated with a natural gas of the following approximate composition:

| | Volume per cent |
|---|---|
| $CH_4$ | 88 |
| $C_2H_6$ | 10 |
| $C_3H_8$ | 2 |
| $C_4H_{10}$ | Trace |

The pretreatment was carried out at 1190° F. and a flow rate of 900 volumes per volume of catalyst per hour for a period of one and one-half hours. When used subsequently to dehydrogenate a butene-butane-steam mixture, efficiency in butadiene production was essentially similar to that described for the pretreated catalyst of Example I.

*Example IV*

The catalyst of Example III after pretreatment with natural gas in the manner described was used to dehydrogenate pentene-2. Conversion efficiency in the first two hours of the test averaged 40 per cent. The same catalyst was used in a subsequent test after reactivation but without pretreatment. The efficiency in the first two hours of this later test averaged only 25 per cent.

While the foregoing descriptive matter and exemplary operations have given specific illustrations of the operation of our process, many modifications are possible within the broad scope of the principles disclosed. Therefore, no limitations are intended except as expressed in the following claims.

We claim:

1. A process for the catalytic dehydrogenation of low-boiling aliphatic olefins having at least four carbon atoms per molecule to produce the corresponding diolefins which comprises passing said olefins admixed with sufficient inert diluent to produce olefin partial pressures in the range of about 0.1 to about 0.5 atmosphere over a dehydrogenation catalyst comprising bauxite bearing catalytic proportions of a metal hydroxide chosen from the group consisting of barium and strontium hydroxides at temperatures of about 1100 to about 1300° F. and flow rates of from 500 to 5000 gas volumes per volume of catalyst per hour, whereby the olefins are partially converted to the corresponding diolefins, periodically interrupting the flow of olefin feed stock, reactivating the catalyst by treating same with an oxygen-containing gas to burn off carbonaceous deposits accumulated during a conversion period, and pretreating said reactivated catalyst prior to reintroduction of the olefin feed stock by passing therethrough a paraffinic hydrocarbon gas consisting essentially of paraffinic hydrocarbon of one to three carbon atoms at temperatures and flow rates substantially within the dehydrogenation range for a period time sufficient to substantially improve the catalyst activity but substantially shorter than the conversion period.

2. A process as in claim 1 in which the paraffinic hydrocarbon gas consists essentially of methane.

3. A process as in claim 1 in which the paraffinic hydrocarbon gas consists essentially of propane.

4. A process as in claim 1 in which the paraffinic hydrocarbon gas consists essentially of natural gas substantially free of hydrocarbons boiling above propane and of olefins.

5. A process for the catalytic dehydrogenation of low-boiling aliphatic olefin hydrocarbon stocks having at least four carbon atoms per molecule to produce the corresponding diolefins which comprises passing said olefins at a temperature within the range of about 1100° F. to about 1300° F. into contact with a catalyst comprising a major proportion of an aluminum oxide and a minor proportion of a metal hydroxide selected from the group consisting of barium and strontium hydroxides; periodically interrupting the flow of said olefin; regenerating the catalyst by oxidation of carbonaceous material deposited thereon; and pretreating the catalyst following said regeneration and prior to use in the conversion by passing a pretreating gas consisting essentially of paraffin hydrocarbon of one to three carbon atoms per molecule and substantially free from diluent gases, from hydrocarbons boiling above propane and from olefins into contact with said catalyst at a temperature within the range of about 1100 to about 1300° F. for a period of time sufficient to substantially improve the catalyst activity and initial catalyst efficiency in the production of said diolefins from said olefins.

6. A process for the catalytic dehydrogenation of normal butenes to produce butadiene which comprises passing said butenes admixed with sufficient water vapor to produce a butene partial pressure in the range of about 0.1 to about 0.5 atmosphere over a dehydrogenation catalyst comprising aluminum oxide bearing catalytic proportions of a metal hydroxide chosen from the group consisting of barium and strontium hydroxides at temperatures of about 1100 to about 1300° F. and flow rates of from 500 to 5000 gas volumes per volume of catalyst per hour, whereby the butenes are partially converted to the butadienes, periodically interrupting the flow of butene feed stock, reactivating the catalyst by treating same with an oxygen-containing gas to burn off carbonaceous deposits accumulated during a conversion period, and pretreating said reactivated catalyst prior to reintroduction of the butene feed stock by passing therethrough a paraffinic hydrocarbon gas consisting essentially of paraffin hydrocarbon of one to three carbon atoms per molecule and substantially free from hydrocarbons boiling above propane and from olefins at temperatures and flow rates substantially within the dehydrogenation range for a period of time sufficient to substantially improve the catalyst activity and initial catalyst efficiency in the production of butadiene from normal butenes but substantially shorter than the conversion period.

7. A process for the catalytic dehydrogenation of low-boiling aliphatic olefins having at least four carbon atoms per molecule to produce the corresponding diolefins which comprises passing said olefins admixed with sufficient inert diluent to produce olefin partial pressures in the range of about 0.1 to about 0.5 atmosphere over a bauxite dehydrogenation catalyst at temperatures of about 1100 to about 1300° F. and flow rates of from 500 to 5000 gas volumes per volume of catalyst per hour, whereby the olefins are partially converted to the corresponding diolefins, periodically interrupting the flow of olefin feed stock, reactivating the catalyst by treating same with an oxygen-containing gas to burn off carbonaceous deposits accumulated during a conversion period, and pretreating said reactivated catalyst prior to reintroduction of the olefin feed stock by passing therethrough a paraffinic hydrocarbon gas consisting essentially of paraffinic hydrocarbon of one to three carbon atoms at temperatures and flow rates substantially within the dehydrogenation range for a period of time sufficient to substantially improve the catalyst activity but substantially shorter than the conversion period.

WALTER A. SCHULZE.
JOHN C. HILLYER.